United States Patent
Boschker

(10) Patent No.: US 9,620,978 B2
(45) Date of Patent: Apr. 11, 2017

(54) SYSTEM AND METHOD FOR EXTENDING THE PHYSICAL LIFE OF BATTERIES IN MOBILE DEVICES

(75) Inventor: Breght Roderick Boschker, Hilversum (NL)

(73) Assignee: TomTom International B.V., Amsterdam (NL)

(*) Notice: Subject to any disclaimer, the term of this patent is extended or adjusted under 35 U.S.C. 154(b) by 416 days.

(21) Appl. No.: 13/809,915

(22) PCT Filed: Jul. 13, 2010

(86) PCT No.: PCT/EP2010/004405
§ 371 (c)(1),
(2), (4) Date: Jan. 14, 2013

(87) PCT Pub. No.: WO2012/007024
PCT Pub. Date: Jan. 19, 2012

(65) Prior Publication Data
US 2013/0113435 A1    May 9, 2013

(51) Int. Cl.
*H02J 7/00* (2006.01)
*B60L 11/18* (2006.01)
*G01C 21/26* (2006.01)

(52) U.S. Cl.
CPC ......... *H02J 7/0068* (2013.01); *B60L 11/1861* (2013.01); *G01C 21/26* (2013.01); *B60L 2200/26* (2013.01); *B60L 2250/16* (2013.01); *Y02T 10/7005* (2013.01); *Y02T 10/705* (2013.01); *Y02T 10/7044* (2013.01); *Y02T 90/161* (2013.01)

(58) Field of Classification Search
CPC ........................... B60L 11/1861; H02J 7/0068

USPC .......................................................... 320/134
See application file for complete search history.

(56) References Cited

U.S. PATENT DOCUMENTS

| 6,100,666 A * | 8/2000 | Ryu ...................... G01R 31/36 320/132 |
| 8,054,192 B2 * | 11/2011 | Grigsby et al. ................ 340/663 |
| 2003/0016130 A1 * | 1/2003 | Joao ...................... B60R 25/102 340/539.1 |
| 2003/0067541 A1 * | 4/2003 | Joao ...................... B60R 25/102 348/148 |
| 2005/0174094 A1 * | 8/2005 | Purdy et al. .................. 320/134 |

(Continued)

FOREIGN PATENT DOCUMENTS

| EP | 2141043 A1 | 1/2010 |
| JP | 2004147460 A | 5/2004 |
| JP | 2009042161 A | 2/2009 |

OTHER PUBLICATIONS

International Search Report issued Sep. 21, 2011 for International Application No. PCT/EP2010/004405.

*Primary Examiner* — Samuel Berhanu
*Assistant Examiner* — Tessema Kebede

(57) ABSTRACT

Disclosed is a method and device 700 for determining an expected usage of the device, determining a charge level of a battery 750 associated with the device, and tuning the charge level of the battery by at least one of charging the battery based on the determined expected usage of the device and the determined charge level of the battery, and discharging the battery by changing an operation of the device based on the determined charge level of the battery and the determined expected usage of the device.

19 Claims, 15 Drawing Sheets

(56) References Cited

U.S. PATENT DOCUMENTS

| | | | |
|---|---|---|---|
| 2005/0248313 A1 | 11/2005 | Thorland | |
| 2008/0254810 A1* | 10/2008 | Fok | G01S 5/0009 |
| | | | 455/456.2 |
| 2010/0123436 A1* | 5/2010 | Herrod et al. | 320/132 |
| 2010/0251134 A1* | 9/2010 | Van Seggelen | G06F 9/4443 |
| | | | 715/744 |
| 2011/0029227 A1* | 2/2011 | Geelen et al. | 701/200 |
| 2011/0118972 A1* | 5/2011 | Boschker | 701/200 |
| 2011/0159931 A1* | 6/2011 | Boss | H04W 52/0264 |
| | | | 455/574 |
| 2011/0263268 A1* | 10/2011 | Shcherbatyuk | 455/456.1 |

* cited by examiner

| Temperature (°C) | 40% charge level | 100% charge level |
|---|---|---|
| 0 | 98% after 1 year | 94% after 1 year |
| 25 | 96% after 1 year | 80% after 1 year |
| 40 | 85% after 1 year | 65% after 1 year |
| 60 | 75% after 1 year | 60% after 1 year |

Fig. 11

SYSTEM AND METHOD FOR EXTENDING THE PHYSICAL LIFE OF BATTERIES IN MOBILE DEVICES

CROSS-REFERENCES TO RELATED APPLICATIONS

This application is the National Stage of International Application No. PCT/EP2010/004405, filed Jul. 13, 2010 and designating the United States. The entire content of this application is incorporated herein by reference.

FIELD

This disclosure generally relates to a system or method for extending the physical life of batteries in mobile devices. In at least one embodiment this is achieved by taking into account a predicted usage of the device, for example, the expected travel duration associated with navigation devices or play times associated with audio or video files. The Illustrative embodiments relate to portable navigation devices (so-called PNDs); in particular PNDs that include Global Positioning System (GPS) signal reception and processing functionality. Other embodiments relate, more generally, to any type of processing device that is configured to predict usage of the device.

BACKGROUND

Battery life of a device may be influenced by a number of factors. These factors may be, for example, operating or storage temperature, charging behavior, a number of charge cycles and time between charge cycles. Furthermore, optimal charging, use and storage patterns are different based on the type of battery technology that is used. However, generally battery life decreases with each charge cycle (due to chemical processes taking place inside the battery) until the battery has reached the end of its usable life. In addition, certain batteries suffer irreparable damage from getting over- or undercharged.

Mobile devices, for example navigation systems, are typically plugged into a DC voltage source (e.g., a cigarette lighter adapter) and charge the battery while connected and until the mobile device reaches a full charge. This strategy may be a best effort to always provide an end-user with a (somewhat) charged device. However, the strategy may decrease the overall life of the battery and thereby the usable life of the device.

Older battery technologies such NiCd or NiMH require regular (full) charge and/or discharge cycles to ensure good battery life. This requires a user to keep track of battery charge levels. With the advent of newer battery technologies, some drawbacks were resolved. However, newer battery technologies are still susceptible to charging and storage patterns.

A mobile device may include but is not limited to, for example, a portable navigation device (PND) that includes GPS (Global Positioning System) signal reception and processing functionality that are well known and are widely employed as automobile or other vehicle navigation systems. Such devices are of great utility when the user is not familiar with the route to the destination to which they are navigating.

Other mobile devices may include but are not limited to, for example, a portable music or video player. Although several examples of mobile devices are listed in this disclosure, the disclosure is not limited to those mobile devices listed and indeed applies to many mobile devices.

SUMMARY

According to one example embodiment, a method for operating a device is disclosed. The method includes determining an expected usage of the device, determining a charge level of a battery associated with the device, and tuning the charge level of the battery by at least one of charging the battery based on the determined expected usage of the device and the determined charge level of the battery, and discharging the battery by changing an operation of the device based on the determined charge level of the battery and the determined expected usage of the device.

Another example embodiment of the present disclosure is directed to a device. The device includes a battery, a power connection to an external power source, a power management unit and a power management logic unit. The power management unit is configured to charge the battery via the power connection and configured to provide power to the device via the battery or the power connection. The power management logic unit is configured to determine an expected usage of the device, determine a charge level of the battery, and tune the charge level of the battery by at least one of charging the battery based on the determined expected usage of the device and the determined charge level of the battery, and discharging the battery by changing an operation of the device based on the determined charge level of the battery and the determined expected usage of the device.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present disclosure, and arrangements embodying those teachings, will hereafter be described by way of illustrative example with reference to the accompanying drawings, in which:

FIGS. 5a to 5i are illustrative screenshots from a navigation device for a destination input process;

FIG. 11 is a table illustrating capacity loss of Lithium-Ion batteries as a function of temperature and charge.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF EXAMPLE EMBODIMENTS

Example embodiments of the present disclosure will now be described with particular reference to a PND. It should be remembered, however, that the teachings of the present disclosure are not limited to PNDs but are instead universally applicable to any type of mobile device that is configured to predict usage of the device and includes a battery.

It follows therefore that in the context of the present application, a navigation device is intended to include (without limitation) any type of route planning and navigation device, irrespective of whether that device is embodied as a PND, mobile telephone or portable digital assistant (PDA) executing route planning and navigation software.

Further, it follows that in the context of the present application, a mobile device is intended to include (without limitation) any type of processing device that is configured to predict usage of the device. For example, the predicted usage may be based on a time length of one or more video files, a time length of one or more audio files and/or a time length of a playlist including a plurality of audio files and/or a plurality of video files.

It will also be apparent from the following that the teachings of the present disclosure even have utility in circumstances where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
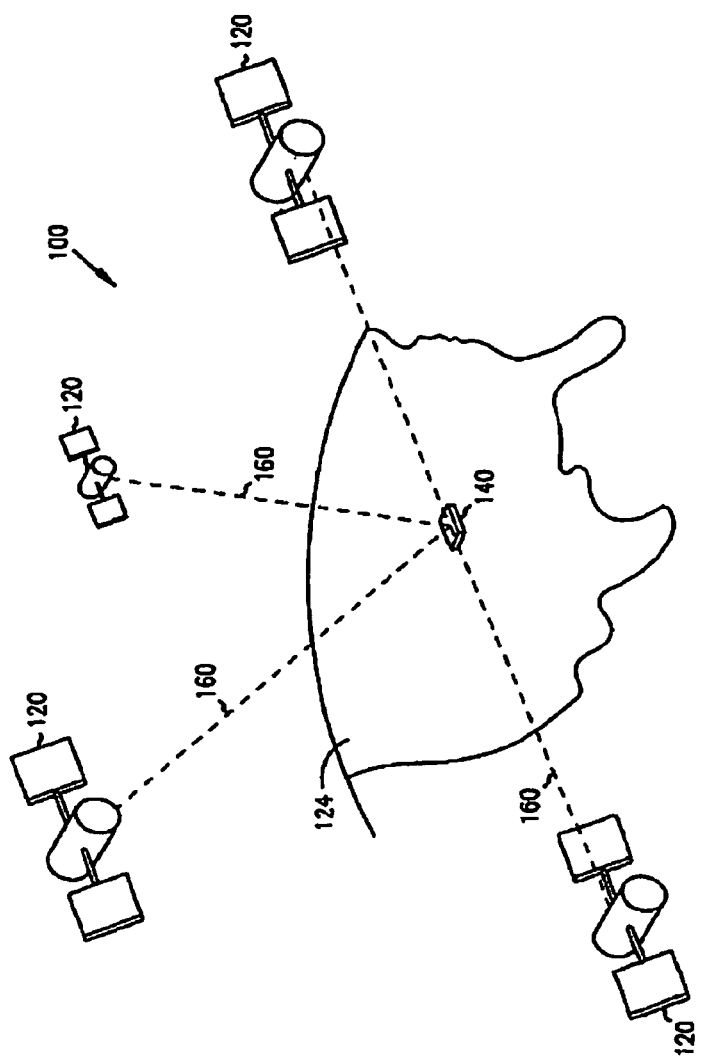
FIG. 1 is a schematic illustration of a Global Positioning System (GPS)

With the above provisos in mind, FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
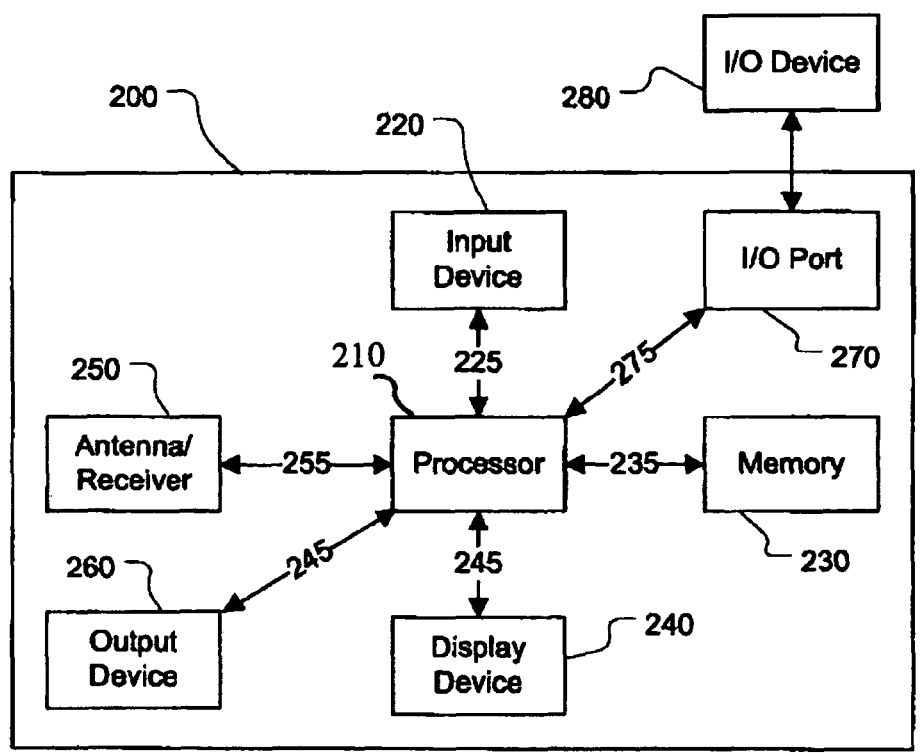
FIG. 2 is a schematic illustration of electronic components arranged to provide a navigation device.

FIG. 2 is an illustrative representation of electronic components of a navigation device 200 according to an example embodiment of the present disclosure, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In an example arrangement, the input device 220 and display screen 240 are integrated into an integrated input and display device, including a touchpad or touch screen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 240 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectable to an I/O device 280 external to the navigation device 200. The memory resource 230 comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
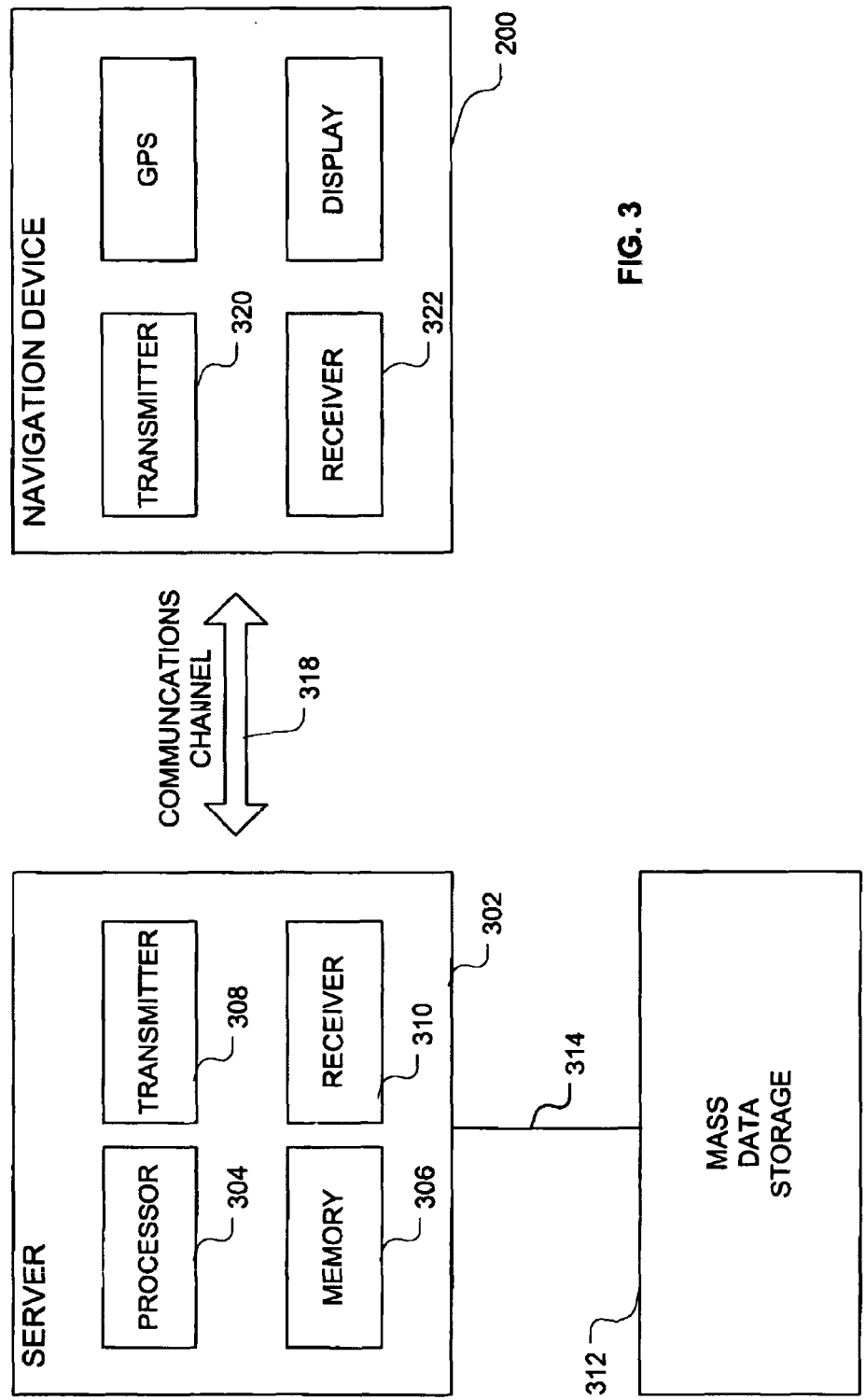
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GRPS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 may be integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 260, such as audio input/output devices for example.

Figure 4A:
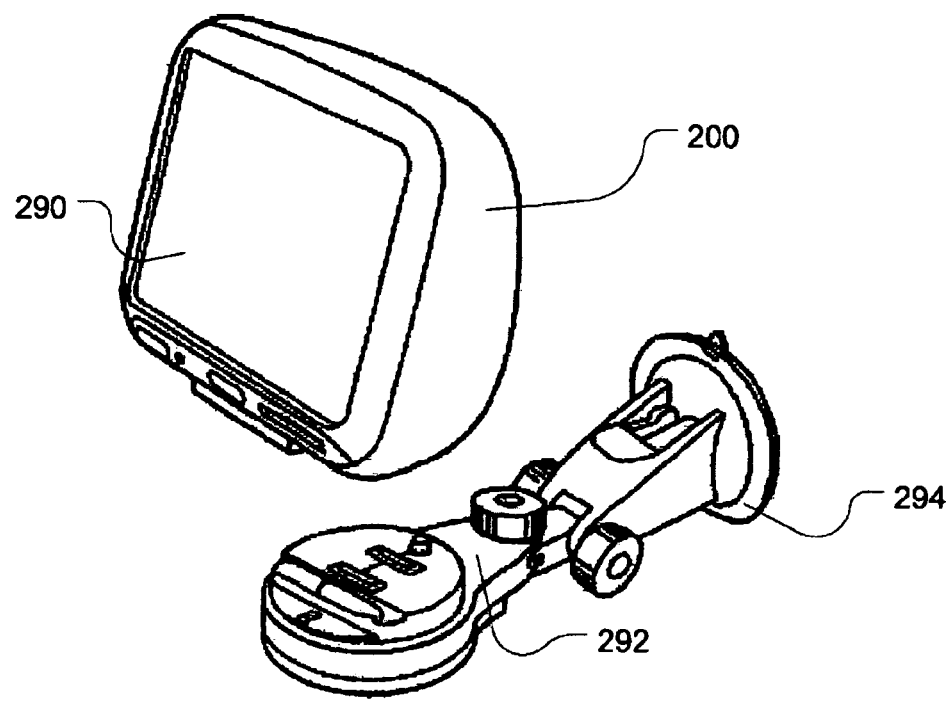
FIGS. 4A and 4B are illustrative perspective views of a navigation device.
Figure 4B:
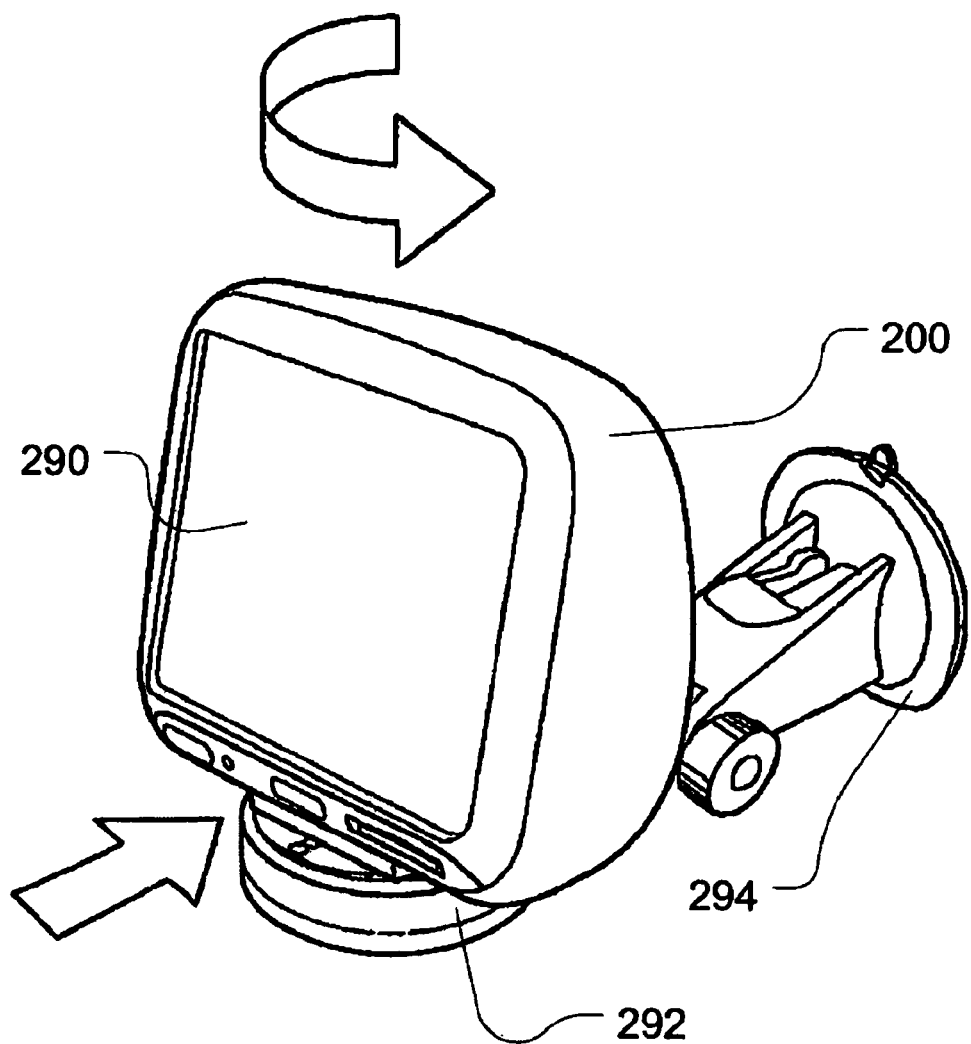

FIGS. 4A and 4B are perspective views of a navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 230, etc.).

The navigation device 200 may sit on an arm 292, which itself may be secured to a vehicle dashboard/window/etc. using a suction cup 294. This arm 292 is one example of a docking station to which the navigation device 200 can be docked.

As shown in FIG. 4B, the navigation device 200 can be docked or otherwise connected to an arm 292 of the docking station by snap connecting the navigation device 292 to the arm 292 for example. The navigation device 200 may then be rotatable on the arm 292, as shown by the arrow of FIG. 4B. To release the connection between the navigation device 200 and the docking station, a button on the navigation device 200 may be pressed, for example. Other equally suitable arrangements for coupling and decoupling the navigation device to a docking station are well known to persons of ordinary skill in the art.

Referring now to FIGS. 5a to 5i there is depicted a series of screenshots from a navigation device 200. This navigation device 200 has a touch screen interface for displaying information to a user and for accepting input to the device from the user. The screenshots show an illustrative example embodiment of a destination location input process for a user whose home location has been set to the offices in The Hague of the European Patent Office, and who wishes to navigate to a street address in Amsterdam, The Netherlands for which they know the street name and building number.

Figure 5A:
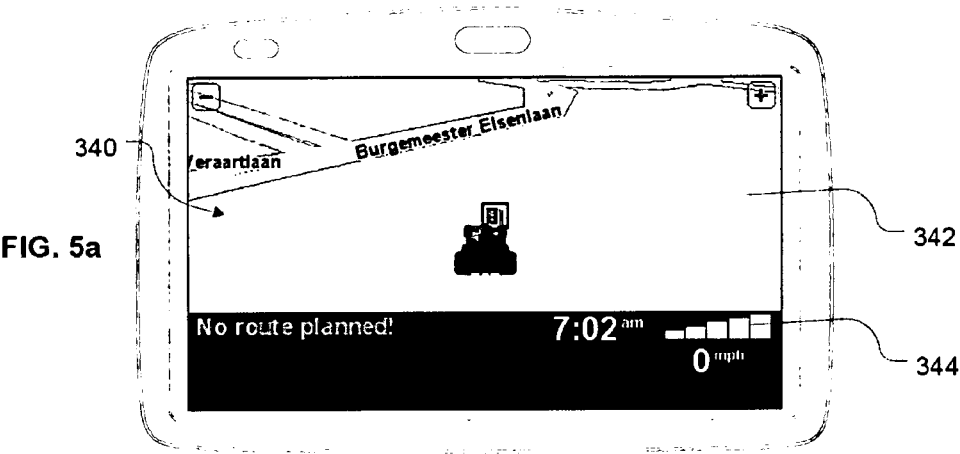

When this user switches on their navigation device 200, the device acquires a GPS fix and calculates (in a known manner) the current location of the navigation device 200. The user is then presented, as shown in FIG. 5a, with a display 340 showing in pseudo three-dimensions the local environment 342 in which the navigation device 200 is determined to be located, and in a region 344 of the display 340 below the local environment a series of control and status messages.

Figure 5B:
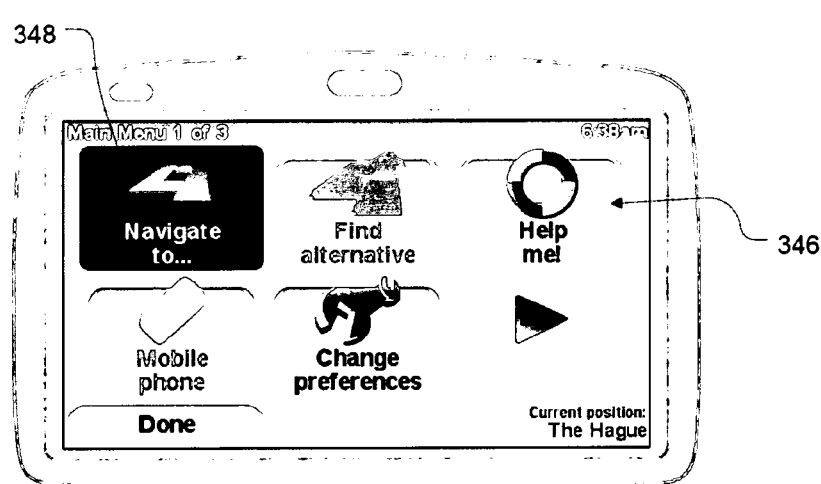

By touching the display of the local environment 342, the navigation device 200 switches to display (as shown in FIG. 5b) a series of virtual buttons 346 by means of which a user can, inter alia, input a destination that they wish to navigate to.

Figure 5C:
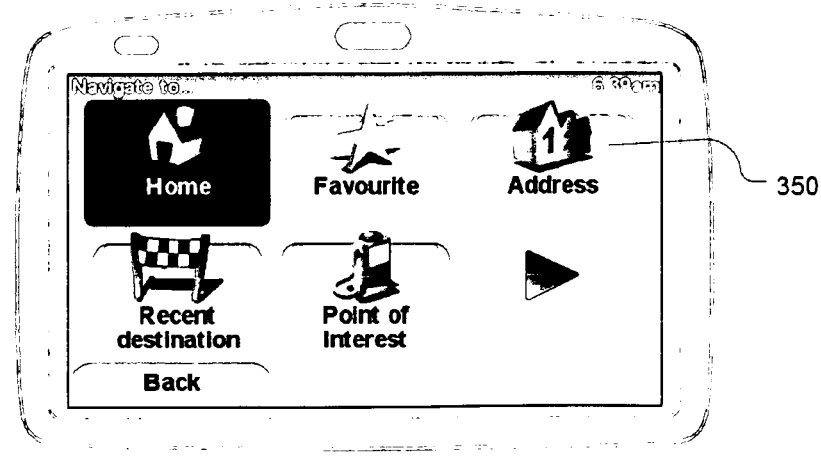

By touching the "navigate to" virtual button 348, the navigation device 200 switches to display (as shown in FIG. 5c) a plurality of virtual buttons that are each associated with a different category of selectable destinations. In this instance, the display shows a "home" button that if pressed would set the destination to the stored home location. However, in this instance as the user is already at their home location (namely the EPO's offices in the Hague) selecting this option would not cause a route to be generated. The "favourite" button, if pressed, reveals a list of destinations that the user has previously stored in the navigation device 200 and if one of these destinations is then selected the destination for the route to be calculated is set to the selected previously stored destination. The "recent destination" button, if pressed, reveals a list of selectable destinations held in the memory of the navigation device 200 and to which the user has recently navigated. Selection of one of the destinations populating this list would set the destination location for this route to the selected (previously visited) location. The "point of interest" button, if pressed, reveals a number of options by which a user can opt to navigate to any of a plurality of locations, such as cash machines, petrol stations or tourist attractions for example, that have been pre-stored in the device as locations that a user of the device might want to navigate to. The "arrow" shaped virtual button opens a new menu of additional options, and the "address" button 350 commences a process by which the user can input the street address of the destination that they wish to navigate to.

Figure 5D:
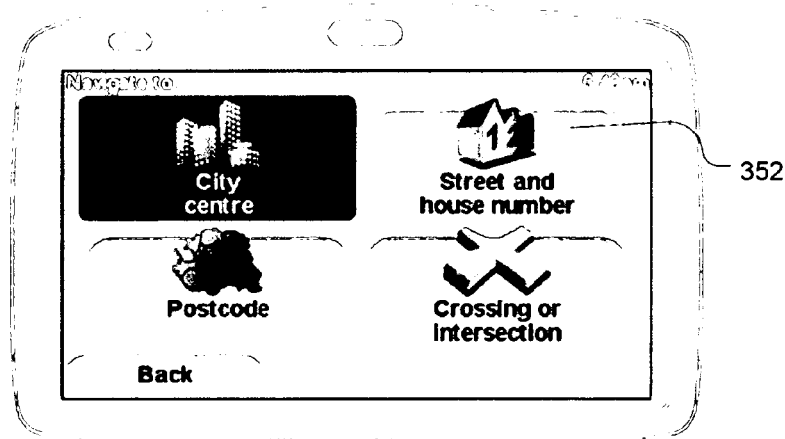

Since the user, in this example, knows the street address of the destination that they wish to navigate to, it is assumed that this "address" button is operated (by touching the button displayed on the touch screen), whereupon (as shown in FIG. 5d) the user is presented with a series of address input options—in particular for address input by "city centre", by "postcode", by "crossing or intersection" (for example a junction of two roads) and by "street and house number".

Figure 5E:
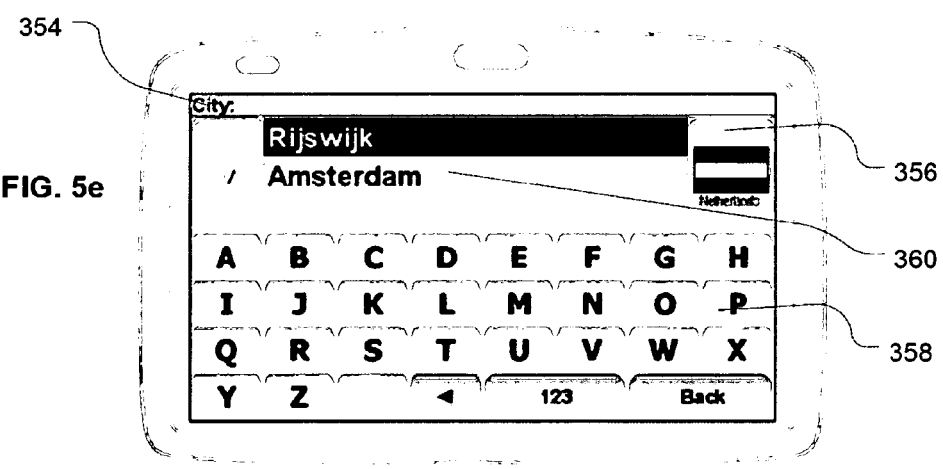

In this example the user knows the street address and house number of the destination and hence selects the "street and house number" virtual button 352 whereupon the user is then presented, as shown in FIG. 5e, a prompt 354 to enter the name of the city that they wish to navigate to, a flag button 356 by which the user can select the country in which the desired city is located, and a virtual keyboard 358 that may be operated by the user, if necessary, to input the name of the destination city. In this instance the user has previously navigated to locations in Rijswijk and Amsterdam, and the PND therefore additionally provides the user with a list 360 of selectable cites.

Figure 5F:
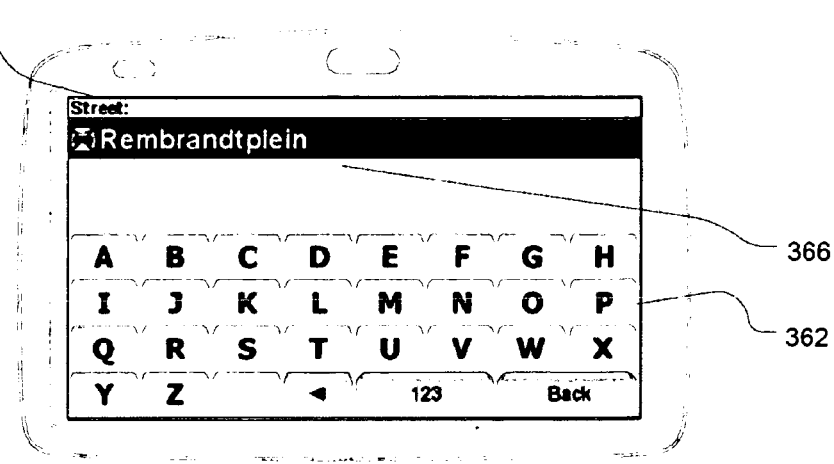
Figure 5A:
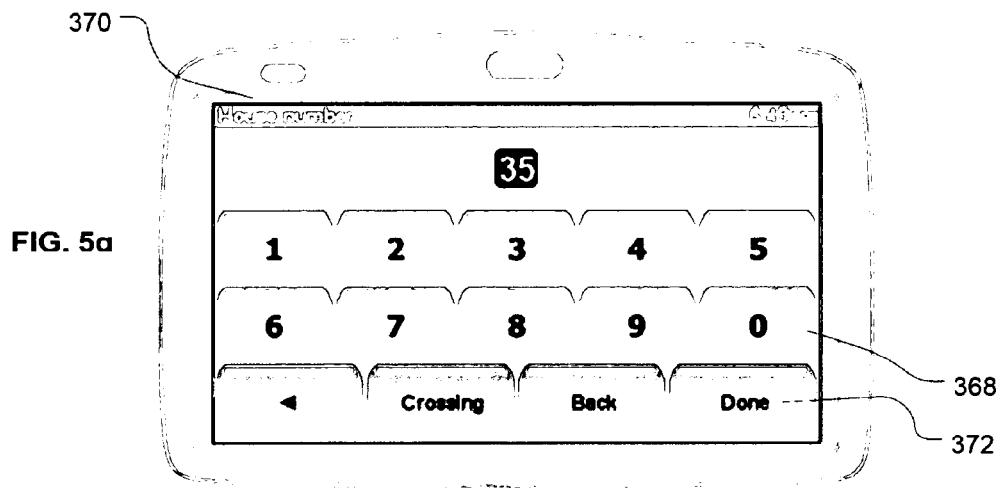

The user in this instance wishes to navigate to Amsterdam, and on selection of Amsterdam from the list 360 the navigation device 200 displays, as shown in FIG. 5f, a virtual keyboard 362 by means of which a user can input street names, a prompt 364 for entry of a street name 364 and, in this instance, as the user has previously navigated to a street in Amsterdam, a list 366 of selectable streets in Amsterdam.

In this example the user wishes to return to the street, Rembrandtplein, that they have previously visited and so selects Rembrandtplein from the displayed list 366.

Once a street has been selected, the navigation device 200 then displays a smaller virtual keypad 368 and prompts the user, via prompt 370, to enter the number of the house in the selected street and city that they wish to navigate to. If the user has previously navigated to a house number in this street, then that number (as shown in FIG. 5g) is initially shown. If, as in this instance, the user wishes to navigate to No. 35, Rembrandtplein once again, then the user need only touch a "done" virtual button 372 displayed at the bottom right hand corner of the display. If the user should wish to navigate to a different house number in Rembrandtplein, then all they need do is operate the keypad 368 to input the appropriate house number.

Figure 5H:
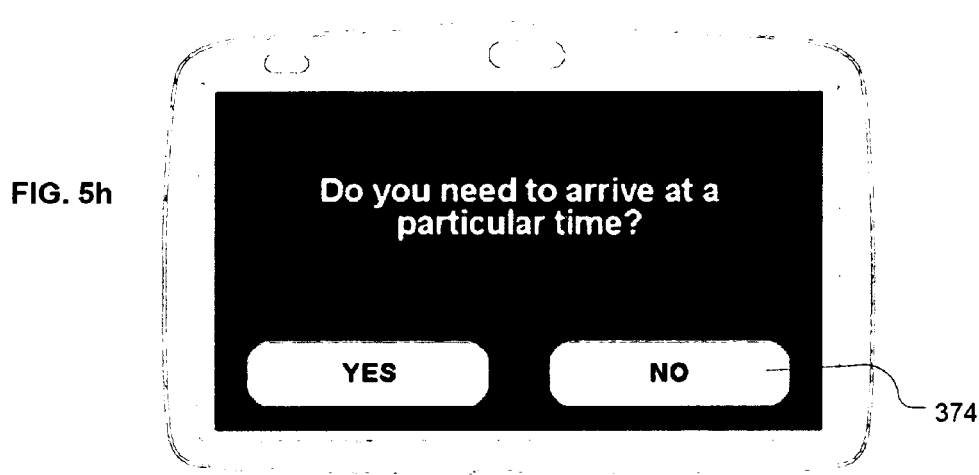

Once the house number has been input, the user is asked in FIG. 5h, whether they wish to arrive at a particular time. If the user should push the "yes" button, then functionality is invoked that estimates the time required to travel to the destination and advises the user when they should leave (or if they are running late, should have left) their current location in order to arrive at their destination on time. In this instance the user is not concerned about arriving at a particular time and hence selects the "no" virtual button.

Figure 5I:
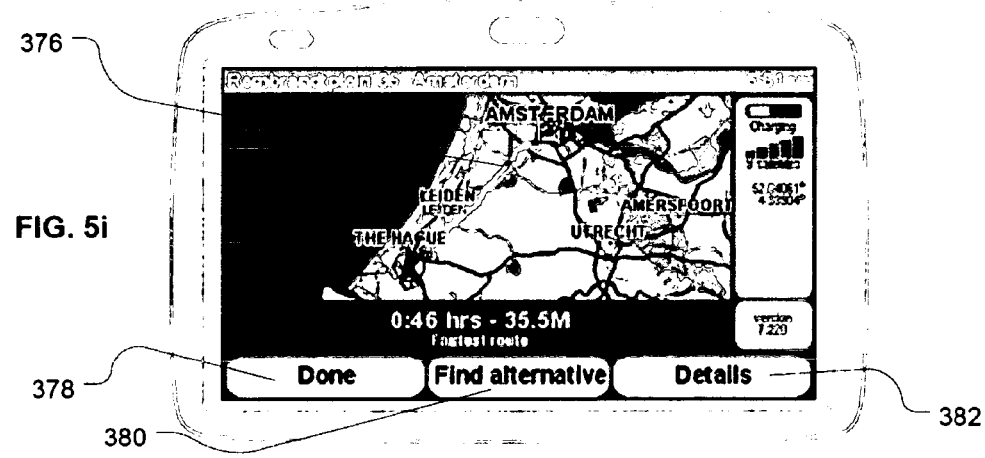

Selecting the "no" button 374 causes the navigation device 200 to calculate a route between the current location and the selected destination and to display that route 376, as shown in FIG. 5i, on a relatively low magnification map that shows the entire route. The user provided with a "done" virtual button 378 which they can press to indicate that they are happy with the calculated route, a "find alternative" button 380 that the user can press to cause the navigation device 200 to calculate another route to the selected destination, and a "details" button 382 that a user can press to reveal selectable options for the display of more detailed information concerning the currently displayed route 376.

Figure 6:
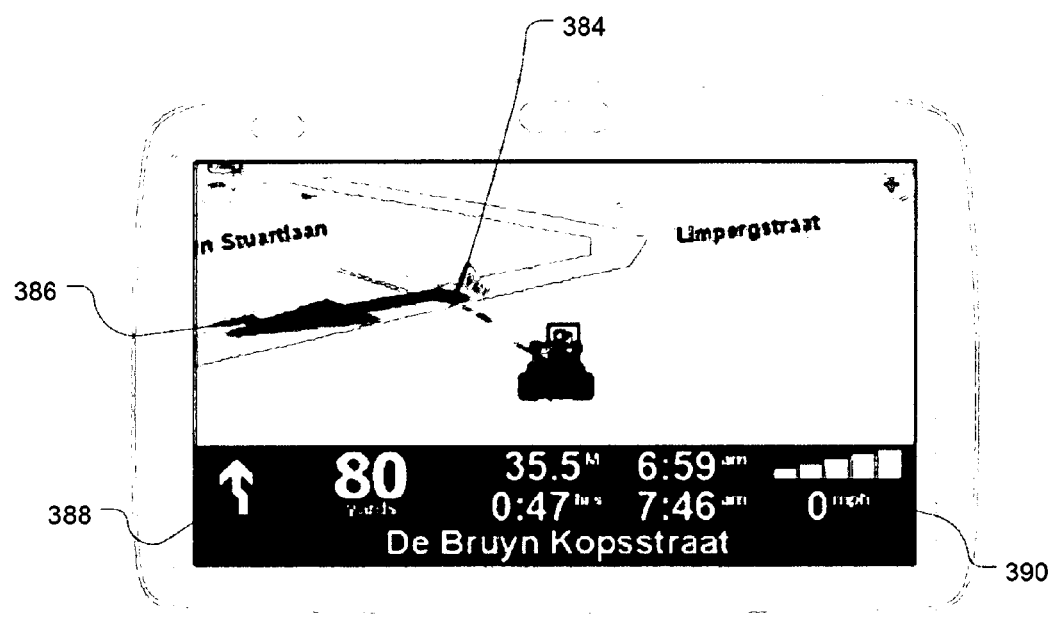
FIG. 6 is an illustrative screenshot from a navigation device depicting a start location for an illustrative calculated route.

In this instance it is assumed that the user is happy with the displayed route, and once the "done" button 378 has been pressed the user is presented, as shown in FIG. 6, with a pseudo three-dimensional view of the current, start, location for the navigation device 200. The display depicted in FIG. 6 is similar to that shown in FIG. 5a except that the displayed local environment 342 now includes a start location flag 384 and a waypoint indicator 386 indicating the next manoeuvre (in this instance, a left hand turn). The lower part of the display has also changed and now displays the name of the street in which the navigation device 200 is currently located, an icon 388 indicating the distance to and type of the next manoeuvre (from the current location of the navigation device 200), and a dynamic display 390 of the distance and time to the selected destination.

The user then commences their journey and the navigation device 200 guides the user, in a known manner, by updating the map in accordance with determined changes in navigation device 200 location, and by providing the user with visual and, optionally, audible navigation instructions.

Figure 7:
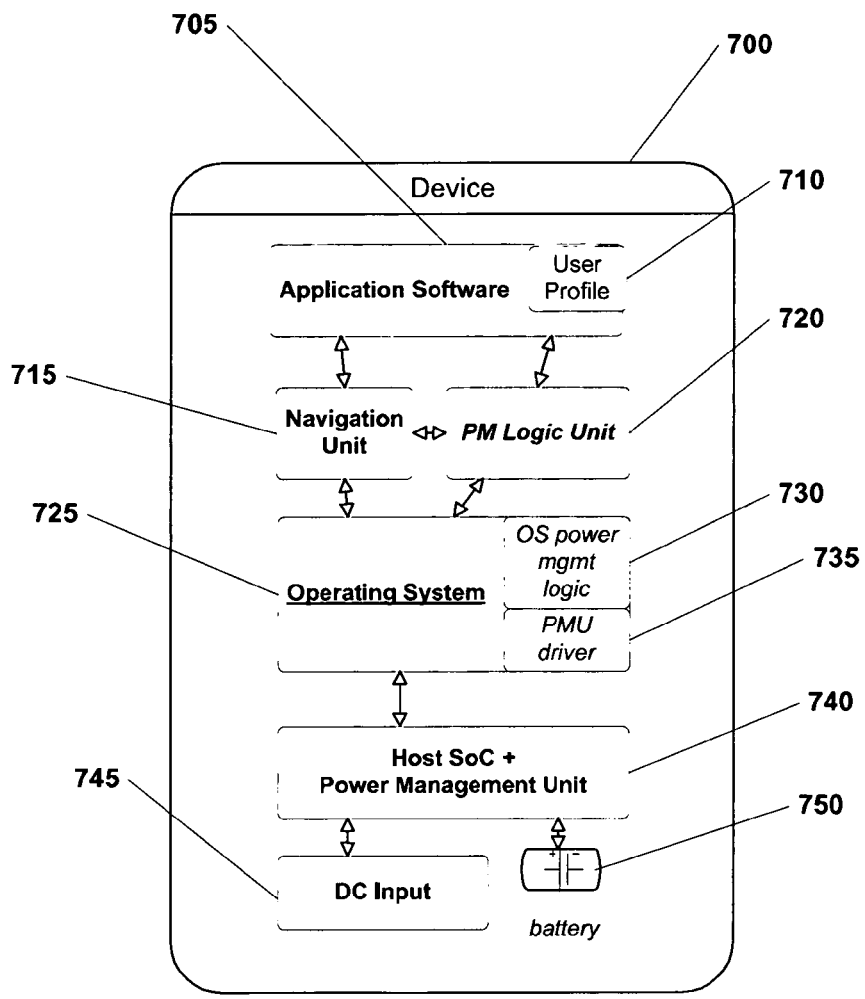
FIG. 7 is a schematic illustration of a device according to example embodiments.

According to various embodiments of the present disclosure, and as illustrated in FIG. 7, a device may include a battery, a power connection to an external power source, a power management unit and a power management logic unit. The power management unit may be configured to charge the battery via the power connection and may be configured to provide power to the device via the battery or the power connection. The power management logic unit may be configured to determine expected usage of the device, determine a charge level of the battery, and tune the charge level of the battery by at least one of charging the battery based on the determined expected usage of the device and the determined charge level of the battery, and discharging the battery by changing an operation of the device based on the determined charge level of the battery and the determined expected usage of the device.

As shown in FIG. 7 the device 700 may include application software 705 including an associated user profile 710. The device 700 may include a navigation unit 715, a power management logic unit 720 and an operating system 725. The operating system 725 may include an associated operating system power management logic 730 and a power management unit driver 735. The device may further include a host system on chip (SoC) and power management unit 740, a DC input 745 and a battery 750.

The application software 705 includes applications known to those skilled in the art. For example, the application software 705 may include an audio player (e.g., an mp3 player, an aac player or a way player), a video player (e.g., an mp4 player, a dvd player or a quicktime TRADEMARK player), or software configured to play playlists (e.g., windows media player TRADEMARK or iTunes TRADEMARK).

As is known, the application software 705 may include user profiles 710. However, according to example embodiments, the user profiles 710 may include information associated with predicted usage of the device 700. For example, the user profile 710 may include information based on a time length of one or more video files, a time length of one or more audio files and/or a time length of a playlist including a plurality of audio files and/or a plurality of video files.

The user profile 710 may also include, for example, information associated with a users travel patterns. User travel patterns may include, for example, a user is known to drive short trips most of the time with long periods of time in which the device is not used (e.g., a salesman making sales calls), drivers that always drive long stretches (e.g., overland truck drivers) or multi-modal users (e.g., commuters who switch between a personally owned vehicle and public transportation).

As shown in FIG. 7 the device 700 may include an operating system 725. The operating system 725 may include an associated operating system power management logic 730 and a power management unit driver 735. The operating system 725, the operating system power management logic 730 and the power management unit driver 735 are known to those skilled in the art and, with the exception of interoperation with example embodiments, will not be described further.

As shown in FIG. 7 the device 700 may include a host system on chip (SoC) and power management unit 740, a DC input 745 and a battery 750. The DC input 745 may be, for example, a cigarette lighter adapter (CLA) and the battery 750 may be, for example, a Li-Ion battery or a Li-Poly battery. The host system on chip (SoC) and power management unit 740 will be described in more detail below with regard to FIG. 8.

As shown in FIG. 7 the device 700 may include a navigation unit 715 or may be a personal navigation device (PND) 200. The navigation unit is described above in more detail with regard to, for example, FIG. 2 and FIG. 3.

As shown in FIG. 7 the device 700 may include a power management logic unit 720. The power management logic unit 720 may be configured to determine expected usage of the device 700, determine a charge level of the battery 750, and tune the charge level of the battery 750 by at least one of charging the battery 750 based on a determined expected usage of the device 700 and a determined charge level of the battery 750, and discharging the battery 750 by changing an operation of the device 700 based on the determined charge level of the battery 750 and the determined expected usage of the device 700.

The power management logic unit 720 may be configured to use data regarding a route determined by the navigation unit 715 to determine an expected usage. The data may include, for example, the route and expected trip duration. Typically, most users will use their navigation systems 200 for the expected trip time and this information can be used to develop a battery charge level tuning strategy.

The power management logic unit 720 may be communicatively coupled to the other elements of the device in order to obtain information and send instructions. For example, the power management logic unit 720 may receive data from the navigation unit 720 associated with a route. The power management logic unit 720 may then determine a target battery charge level. The power management logic unit 720 may receive data from the host system on chip (SoC) and power management unit 740 via the operating system 725 regarding the charge level of the battery 750.

If the charge level of the battery 750 is determined to be greater than the target battery charge level, the power management logic unit 720 may instruct the operating system to perform an operation that results in a discharge of the battery 750. Alternatively, if the charge level of the battery 750 is determined to be less than the target battery charge level the power management logic unit 720 may instruct the host system on chip (SoC) and power management unit 740 to charge the battery 750 via the DC input 745.

Further details of the tuning of the charge level of the battery will be described below with regard to FIG. 10.

Figure 8:
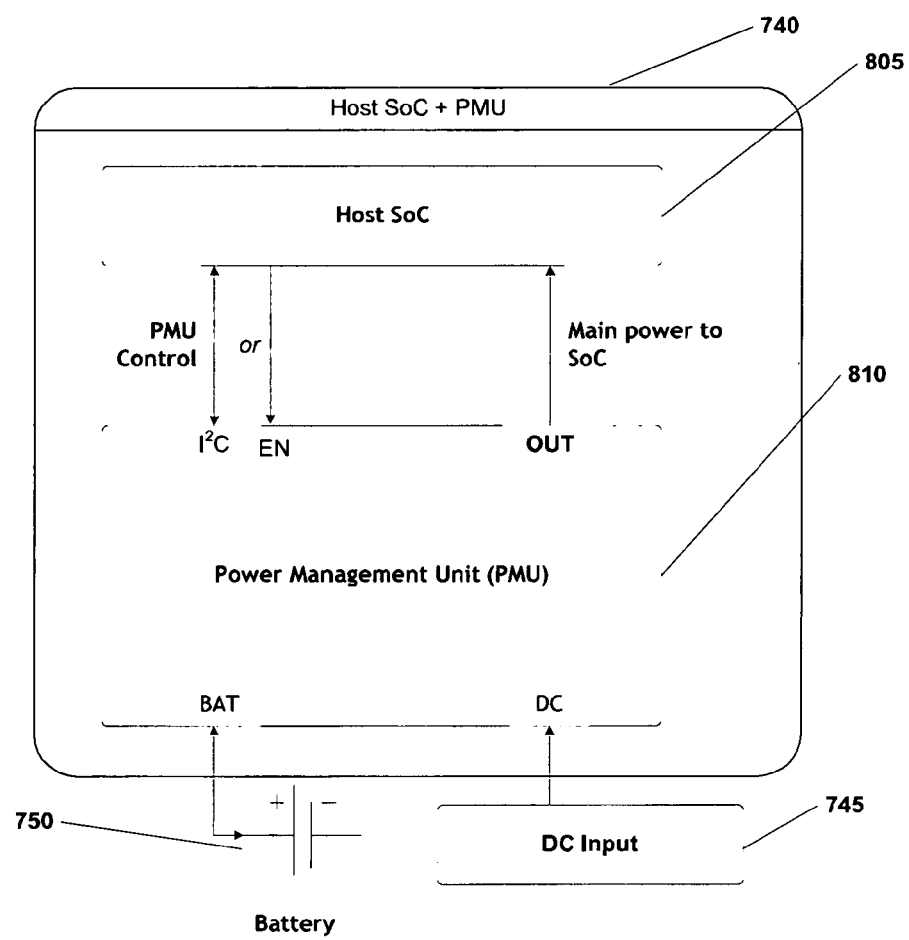
FIG. 8 is a schematic illustration of a power management unit of the device of FIG. 8.

According to various embodiments of the present disclosure, and as illustrated in FIG. 8, a host system on chip (SoC) and power management unit 740 may include a host SoC 805 and a power management unit 810. The power management unit 810 may be configured to direct power from the battery 750 or the DC input 745 to the host SoC 805 which, in some cases, may direct the power to other elements of the device 700. The power management unit 810 may be configured to determine the charge level of the battery 750, to communicate data associated with the charge level of the battery 750 and to charge the battery 750 from the DC input 745.

The host SoC 805 may receive power from the power management unit 810 and for example, use the power to satisfy the power needs of the host SOC or, in some cases, direct the power to other elements of the device 700. The host SoC may instruct the power management unit 810 to charge the battery by, for example, enabling the EN (enabled) input or providing code instructions via the I$^2$C port (programmable control port). The code instructions may be, for example, via a known protocol (e.g., the I²C protocol).

Further, as implied by the name, the host SoC 805 may include the necessary elements (e.g., processors, memories, bus lines and I/O ports) to implement the functions of the device 700. The host SoC 805 may further include the application software 705, the user profile 710, the navigation unit 715, the power management logic unit 720, the operating system 725, the operating system power management logic 730 and the power management unit driver 735 as described above with regard to FIG. 7.

Figure 9A:
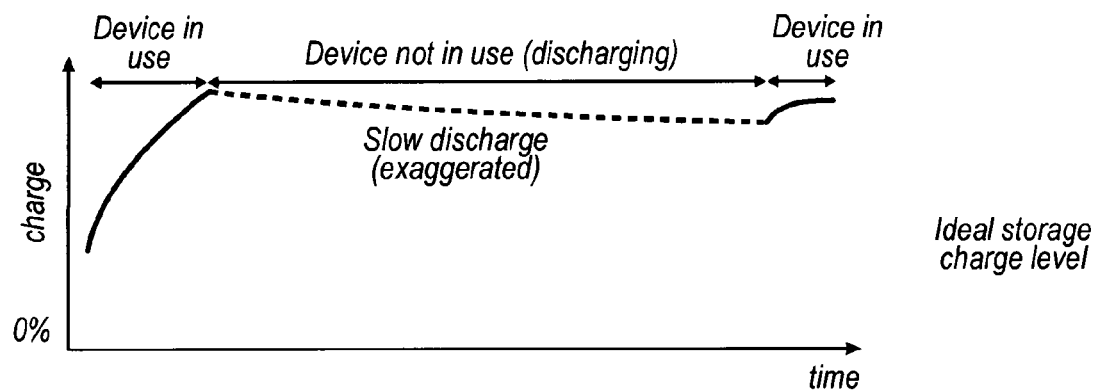
FIGS. 9A to 9D are illustrative charge/discharge cycles of the device of FIG. 7.

FIGS. 9A to 9D are illustrative charge/discharge cycles of the device of FIG. 7. FIG. 9A illustrates a typical charge/discharge cycle where the battery 750 is charged during use (assuming a DC source is plugged into DC input 745) and discharges while not in use. As one skilled in the art knows, a battery (e.g., battery 750) will not hold a charge indefinitely when not in use. The battery (e.g., battery 750) may slowly lose or "leak" charge over time.

Figure 9B:
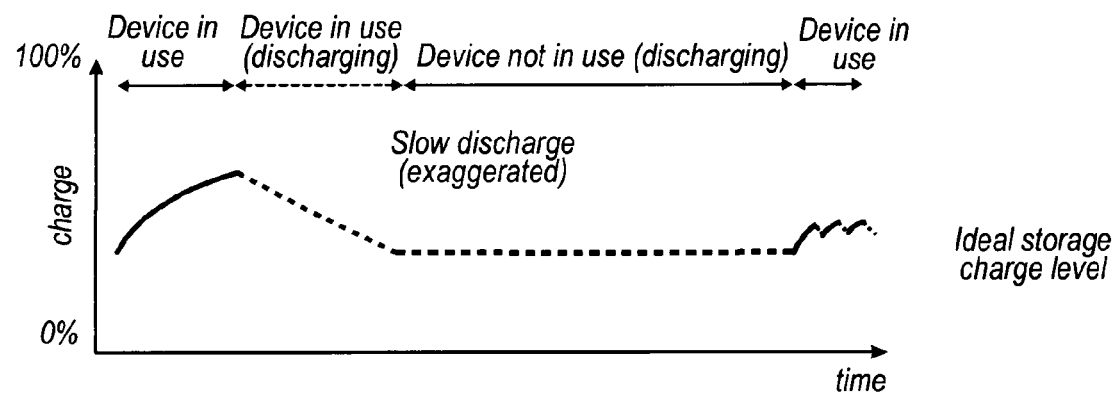
Figure 9C:
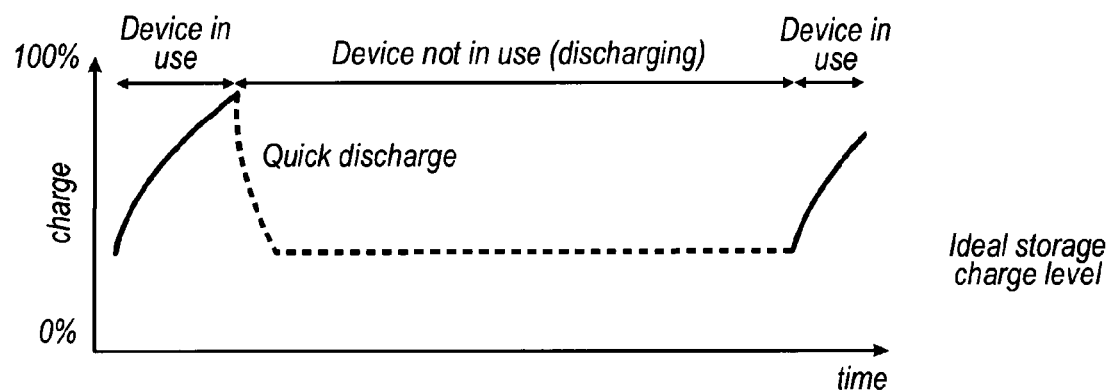
Figure 9D:
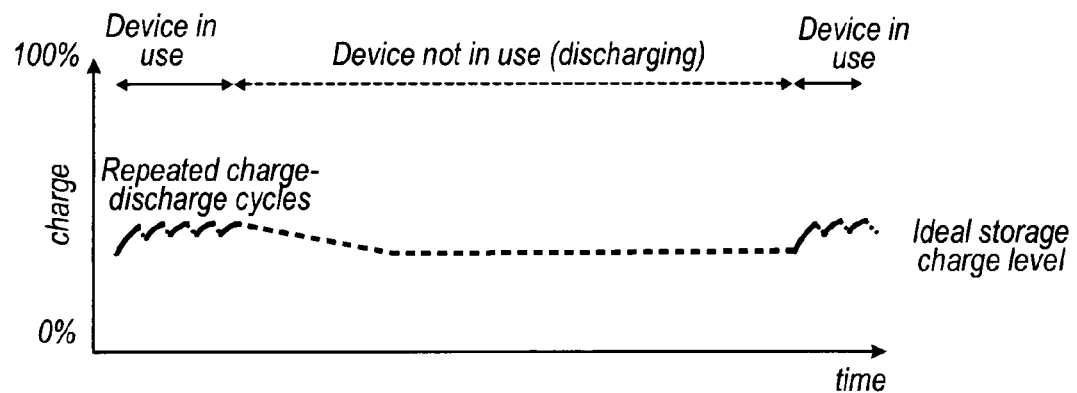

FIG. 9B illustrates a charge/discharge cycle for a device 700 that is not often used (hence storage charge optimized), but with knowledge of expected usage disconnected from charging supply (e.g. in public transport). FIG. 9C illustrates a charge/discharge cycle where the battery 750 is actively drained to an ideal storage level if it is known that the device 700 will not be used for a period of time. FIG. 9D, which is a variation on FIG. 9C, illustrates a charge/discharge cycle where the battery 750 is partially charged and discharged around an ideal storage level, in order to prevent steep or quick discharges as shown in FIG. 9C, if it is known that the device will not be used for a period of time.

Figure 10:
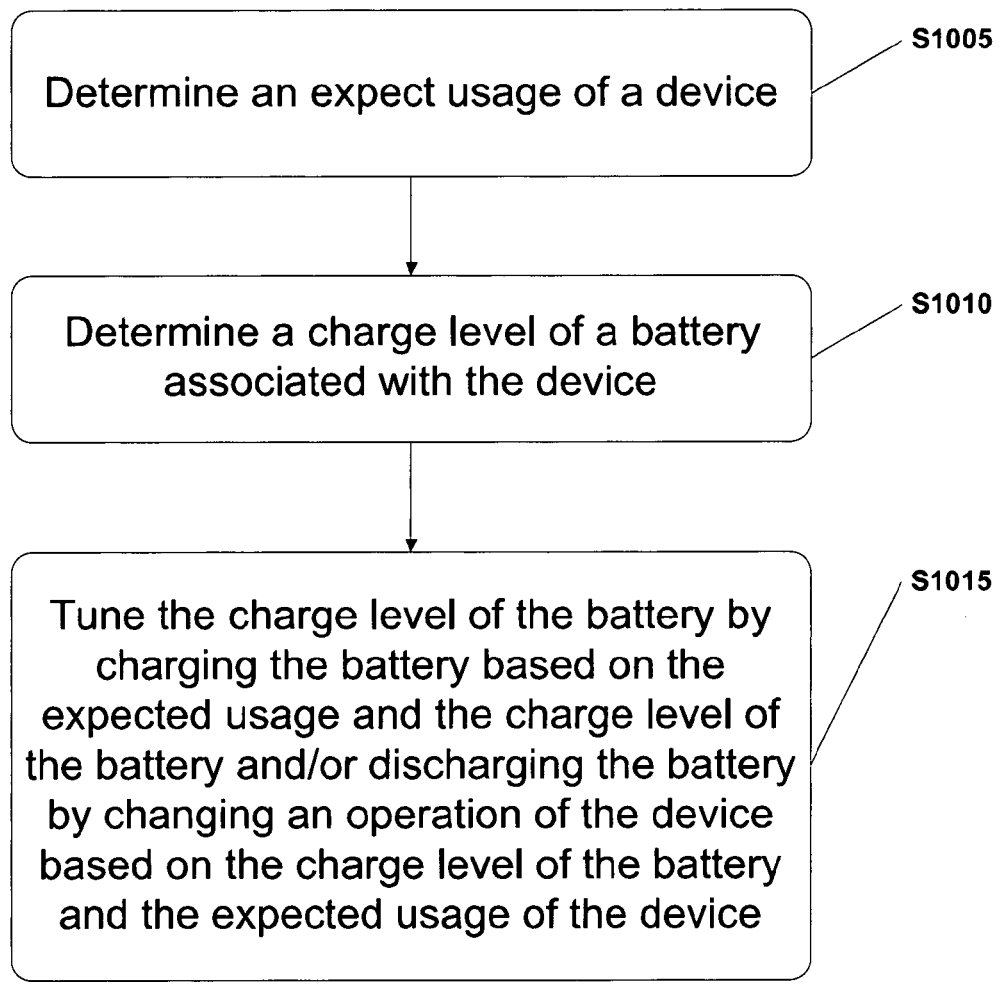
FIG. 10 is a flow diagram of a method of operating a device according to example embodiments.

According to various embodiments of the present application, and as illustrated in FIG. 10, a method for operating a device 700 is disclosed. The method includes determining an expected usage of the device 700, determining a charge level of a battery 750 associated with the device 700, and tuning the charge level of the battery 750 by at least one of charging the battery 750 based on the determined expected usage of the device 700 and the determined charge level of the battery 750, and discharging the battery 750 by changing an operation of the device 700 based on the determined charge level of the battery 750 and the determined expected usage of the device 700.

In step S1005, an expected usage of the device 700 may be determined. If the device 700 is a navigation device 200 and/or includes a navigation unit 715, the expected usage may be based on a determined route. Alternatively, the expected usage may be based on a time length of one or more video files, a time length of one or more audio files and/or a time length of a playlist including a plurality of audio files and/or a plurality of video files.

The expected usage of the device 700 may be based on a route as determined by navigation unit 715. For example, a trip duration may be determined based on the route. The route may also include, for example, multi-modal navigation, areas of increased power demand or other navigational features that effect usage of the device.

Multi-modal navigation may be a route which includes a combination of travel by automobile, pedestrian travel or public transportation. During multi-modal navigation power demand may vary or be relatively constant. However, availability of a power source may be limited or not available. For example, no power source may be available on a public transport vehicle (e.g., a bus or a train).

Certain actions may relatively increase demand for power. For example heavy computations such as signal acquisitions (e.g., GPS or tuning), route planning, wireless communication etc. may relatively increase demand for power. Sometimes the aforementioned operations rely on a minimum battery charge level to be able to function at all (e.g., operating a wireless GPRS modem). Using navigation data to pre-empt some of these situations (e.g. signal acquisition after exiting a tunnel) by changing the charging behavior helps in extending the time the system is usable. As another example, relatively increased power demand may be expected in cases where signal quality may be poor and hence may require extra transmission power. For example, urban canyons, mountainous areas, tunnels, bridges, lower levels of stacked highways, parking garages etc. may relatively increase demand for power because signal quality may be poor.

This scenario gains further relevance when considering multi-modal navigation includes an increase in expected power demand with predicted usage in areas where no charging supply is available such as, for example, planning to go from an automobile to a subway; the latter will most likely be underground, having lower signal strengths and therefore requiring extra transmission power. Furthermore, there will most likely be no opportunity for charging the device while in the subway.

Other navigational features may include regular drivers or drivers that always drive long stretches which may allow for more relaxed charge tuning. A special extension of this is, for example, a salesman that will be using the device 700 the whole day, but in which the device 700 is turned off or detached from the power supply multiple times per day (e.g., when visiting a customer). In such cases, it may be sufficient to use a default or relatively minimal charge tuning.

Alternatively and/or in addition to determining the expected usage of the device 700 based on a route, the expected usage of the device 700 may be based on user profiles. User profiles may include, for example, driving habits, device storage times, types of usage (e.g., navigation, audio playback or video play back). A user profile may be established based on a user's use of the device over a period of time. For example, if a user is known to drive short trips most of the time with long periods of time in which the device 700 is not used, the charge tuning may be optimize for a lower storage charge (e.g., never fully charging the battery). Furthermore, if a system is known or expected to remain unused for a longer period of time, the system may choose to actively drain a full battery to an acceptable level to reduce or prevent permanent physical damage before switching off.

In step S1010, a charge level of the battery 750 may be determined. The power management logic unit 720 may request a battery charge level of the battery 750 from the power management unit 810. The request may include code instructions via, for example, a known protocol (e.g., the I²C protocol).

In step S1015, the charge level of the battery 750 may be tuned based on the expected usage of the device 700 (e.g., based on a determined route or a user profile) and the charge level of the battery 750. For example, as shown in FIG. 9A the battery 750 may be charged during use and discharges while not in use. As discussed above, this tuning may be done if the device 700 is used for long stretches of time. Alternatively, as shown in FIG. 9B the battery 750 may be charged to a first target charge level and discharged to a second target charge level (e.g., an ideal storage level) by normal usage. As discussed above, this tuning may be done if the device 700 is not often used (hence storage charge optimized), but with knowledge of expected usage disconnected from charging supply (e.g., in public transport). This tuning may also be done if it is known that the device 700 will expect an increase in power demand.

Alternatively, as shown in FIG. 9C the battery 750 may be charged to a 100% charge level and discharged to a target charge level (e.g., an ideal storage level) by a quick discharge. As discussed above, this tuning may be done if it is known that the device 700 will not be used for a period of time. Alternatively, as shown in FIG. 9D the battery 750 may be repeatedly charged and discharged while in use. As discussed above, this tuning may be done if it is known that the device 700 will not be used for a period of time.

As described above, in step S1005 the expected usage of the device 700 may be based on a determined route. The determined route may be based on a determined start location and a determined destination location of the device 700 as is described in more detail above with regards to FIGS. 1-3. The route may include multi-modal navigation. Multi-modal navigation may include navigation modes with and without sources of power for charging the battery 750. In step S1015, the charge level of the battery 750 may be tuned based on the navigation modes and may ensure a sufficient charge level of the battery for modes without sources of power.

As described above, the device 700 may expect a relative increase in demand for power. The relative increase in demand may be determined in step S1005. The relative increase in demand may be based on a determined route and/or a user profile. In step S1015, the charge level of the battery 750 may be tuned based on the relative increase in demand.

Tuning the battery 750 charge level (e.g., step S1015) may involve repeatedly charging and discharging the battery 750 while in use. See, for example, FIG. 9D. The battery 750 may be charged and discharged around a target or ideal charge level. The target or ideal charge level may be based on a target or ideal charge storage level.

The table of FIG. 11 illustrates capacity loss of Lithium-Ion batteries as a function of temperature and charge. As is shown in FIG. 11, storing a device with a high charge at higher temperatures leads to a significant permanent capacity loss. The target or ideal charge storage level may be based on minimizing capacity loss due to storing the device 700 with the battery 750 charged to a non-preferred charge level. For example, as shown in FIG. 11 it is preferable to store the battery at a charge level of 40% as compared to a charge level of 100%.

If the DC input 745 providing the mobile device 700 with power is dependent on a limited amount of energy (e.g., the battery charge of an electrical vehicle or a portable computer), navigation information (or other device 700 usage information) may be used to limit or delay the charging strategy of the mobile device. Alternatively, the navigation system may cooperate with, for example, the electrical vehicle to tune other charging systems in the vehicle. For example, if the electrical vehicle is solely relying on battery power (e.g. in a so-called green zone, or at lower speed), devices connected to the vehicle draw extra power from the batteries associated with the vehicle which limits the total charge and thus the action radius (e.g., travel distance of the electrical vehicle). This information (e.g., navigation information or other device 700 usage information) may be used to limit or delay the charging of the battery 750 and/or tune a charge of the batteries associated with other devices associated with the limited energy source.

Mobile device may include but is not limited to, for example, a portable music or video player. Although several examples of mobile devices are listed in this disclosure, the disclosure is not limited to those mobile devices listed and indeed applies to many mobile devices. The mobile devices may be configured to, for example, track usage of the mobile device, track habits of a user using the mobile device, create profiles of use and/or users, and/or store information related to use of the mobile device. The mobile device may have a battery. A charge level of the battery may be tuned based on the usage of the mobile device.

Alternative embodiments of the invention may be implemented as a computer program product for use with a computer system, the computer program product being, for example, a series of computer instructions or program segments stored on a tangible data recording medium (computer readable medium), such as a diskette, CD-ROM, ROM, or fixed disk, or embodied in a computer data signal, the signal being transmitted over a tangible medium or a wireless medium, for example, microwave or infrared. The series of computer instructions or program segments can constitute all or part of the functionality of the method of embodiments described above, and can also be stored in any memory device, volatile or non-volatile, such as semiconductor, magnetic, optical or other memory device.

It will also be appreciated that whilst various aspects and embodiments of the present disclosure have heretofore been described, the scope of the present disclosure is not limited to the particular arrangements set out herein and instead extends to encompass all arrangements, and modifications and alterations thereto, which fall within the scope of the appended claims.

For example, whilst embodiments described in the foregoing detailed description refer to GPS, it should be noted that the navigation device 200 may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location.

It will also be well understood by persons of ordinary skill in the art that whilst the example embodiment implements certain functionality by means of software, that functionality could equally be implemented solely in hardware (for example by way of one or more ASICs (application specific integrated circuit)) or indeed by a mix of hardware and software. As such, the scope of the present disclosure should not be interpreted as being limited only to being implemented in software.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A method for operating a device, the method comprising:
   determining a current location and a destination location of the device;
   determining a route including multi-modal navigation based on the current location and the destination location, wherein multi-modal navigation is a combination of different types of travel;
   determining an expected usage of the device, the expected usage of the device determined based at least in part on properties of portions of the determined route and corresponding features of the device to be used when navigating the portions of the determined route;

determining a charge level of a battery associated with the device;

tuning the charge level of the battery by at least one of: charging the battery based on the determined expected usage of the device and the determined charge level of the battery; and discharging the battery by changing an operation of the device based on the determined charge level of the battery and the determined expected usage of the device, wherein the charge level of the battery is tuned for each of the plurality of modes in the multi-modal navigation.

2. The method of claim 1, wherein the multi-modal navigation includes at least a first mode including a charge source and a second mode not including the charge source, and the charge level of the battery is maintained sufficiently high enough to operate the device during a time period when the device is in the second mode.

3. The method of claim 1, further comprising:
monitoring a usage of the device over a time of use;
determining a user use profile based on the time of use of the device and a power demand over the time of use; and
tuning the charge level of the battery based on the determined user use profile.

4. The method of claim 1, wherein the battery is charged and discharged around a target charge level.

5. The method of claim 4, wherein the target charge level is a target battery storage level.

6. The method of claim 1, comprising:
determining if the device will be stored for a relatively long period of time, wherein the tuning of the charge level of the battery includes one of charging the battery to a storage charge level and actively discharging the battery to the storage charge level before the device is stored, upon determining that the device will be stored for a relatively long period of time.

7. The method as claimed in claim 1, comprising:
determining if a power source for charging the battery is a limited energy source; and
at least one of limiting and delaying the charging of the battery if the power source for charging the battery is determined to be a limited energy source.

8. The method as claimed in claim 1, comprising:
determining if a power source for charging the battery is a limited energy source; and
tuning a charge of batteries associated with other devices associated with the limited energy source based on the expected usage of the device, if the power source is determined to be a limited energy source.

9. A non-transitory computer readable medium including program segments for, when executed on a processor of a navigation device, causing the navigation device to implement the method of claim 1.

10. The method as claimed in claim 1, wherein the device is anyone of a personal navigation device, a mobile phone and a personal digital assistant (PDA).

11. A device, comprising:
a battery;
a power connection to an external power source;
a power management unit configured to charge the battery via the power connection and configured to provide power to the device via one of the battery and the power connection; and a power management logic unit configured to:
determine a current location and a destination location of the device;
determine a route including multi-modal navigation based on the current location and the destination location, wherein the multi-modal navigation is a combination of different types of travel;
determine an expected usage of the device, the expected usage of the device determined based at least in part on properties of portions of the determined route and corresponding features of the device to be used when navigating the portions of the determined route;
determine a charge level of the battery; tune the charge level of the battery by at least one of: charging the battery based on the determined expected usage of the device and the determined charge level of the battery, and discharging the battery by changing an operation of the device based on the determined charge level of the battery and the determined expected usage of the device, wherein the charge level of the battery is tuned for each of a plurality of modes in the multi-modal navigation.

12. The device of claim 11, wherein the multi-modal navigation includes at least a first mode including a charge source and a second mode not including the charge source, and the charge level of the battery is maintained sufficiently high enough to operate the device during a time period when the device is in the second mode.

13. The device of claim 11, wherein the power management logic unit is further configured to:
monitor a usage of the device over a time of use;
determine a user use profile based on the time of use of the device and a power demand over the time of use; and
tune the battery charge level based on the determined user use profile.

14. The device of claim 11, wherein the battery is charged and discharged around a target storage charge level.

15. The device of claim 11, wherein the power management logic unit is further configured to determine if the device will be stored for a relatively long period of time, and the tuning of the charge level of the battery includes one of charging the battery to a storage charge level and actively discharging the battery to the storage charge level before the device is stored, upon determining that the device will be stored for a relatively long period of time.

16. The device of claim 11, wherein the power management logic unit is further configured to:
determine if a power source for charging the battery is a limited energy source; and
at least one of limiting the charging of the battery if the power source for charging the battery is determined to be a limited energy source, delaying the charging of the battery if the power source for charging the battery is determined to be a limited energy source, and tuning a charge of other devices associated with the limited energy source based on the expected usage of the device if the power source for charging the battery is determined to be a limited energy source.

17. The device of claim 11, wherein the device is navigation device including anyone of a personal navigation device, mobile phone and a personal digital assistant (PDA).

18. The method of claim 3, wherein the user use profile includes information based on the time length of one or more audio files and/or video files, and the expected usage of the device is based on said time length.

19. The device of claim 13, wherein the user use profile includes information based on the time length of one or more audio files and/or video files, and the expected usage of the device is based on said time length.

* * * * *